United States Patent [19]
Honma et al.

[11] Patent Number: 5,641,194
[45] Date of Patent: Jun. 24, 1997

[54] BODY STRUCTURE FOR MOTOR VEHICLE

[75] Inventors: Masayuki Honma, Ora; Toshio Masuda, Ashikaga, both of Japan

[73] Assignee: Fuji Jukogyo Kabushiki Kaisha, Tokyo, Japan

[21] Appl. No.: 510,532

[22] Filed: Aug. 2, 1995

[30]    Foreign Application Priority Data

Aug. 31, 1994 [JP] Japan .................................. 6-230467

[51] Int. Cl.$^6$ .................................................. B62D 25/20
[52] U.S. Cl. ........................... 296/188; 296/204; 296/209
[58] Field of Search ................................. 296/188, 189, 296/204, 209

[56] References Cited

U.S. PATENT DOCUMENTS

| 2,301,593 | 11/1942 | Ulrich | 296/204 X |
|---|---|---|---|
| 4,068,884 | 1/1978 | Watanabe et al. | 296/204 |
| 4,747,636 | 5/1988 | Harasaki et al. | 296/203 X |
| 4,934,751 | 6/1990 | Shimoda | 296/188 |

FOREIGN PATENT DOCUMENTS

| 1800778 | 10/1970 | Germany | 296/203 |
|---|---|---|---|
| 3119666 | 1/1982 | Germany | 296/203 |
| 259577 | 12/1985 | Japan | 296/209 |
| 62-39375 | 2/1987 | Japan | 296/209 |
| 62-125956 | 6/1987 | Japan | 296/204 |
| 62-258868 | 11/1987 | Japan | 296/209 |
| 141372 | 5/1990 | Japan | 296/204 |
| 2-283578 | 11/1990 | Japan | 296/209 |
| 4215574 | 8/1992 | Japan | 296/209 |
| 5097057 | 4/1993 | Japan | 296/189 |
| 5-185960 | 7/1993 | Japan | 296/209 |
| 6211167 | 8/1994 | Japan | 296/204 |
| 6263062 | 9/1994 | Japan | 296/203 |
| 6270845 | 9/1994 | Japan | 296/188 |
| 1356112 | 6/1974 | United Kingdom | 296/203 |

*Primary Examiner*—Dennis H. Pedder
*Attorney, Agent, or Firm*—Beveridge, DeGrandi, Weilacher & Young

[57]    ABSTRACT

A side body structure of a motor vehicle includes a first and second crash boxes at the connecting portion of a side sill and a rear wheel arch. The first crash box is provided outside of a side sill reinforcement and the second crash box is inside the side sill reinforcement. The second crash box is connected with a cross member extended in a transversal direction of the vehicle. In the event of a side impact, first the first crash box collapses and then the second crash box does. Finally, the impact energy is transferred to and absorbed by other body structures through the cross member. The side sill portion and the rear wheel arch portion can be prevented from intruding into a rear compartment so as to save passengers from serious injury.

2 Claims, 3 Drawing Sheets

BODY STRUCTURE FOR MOTOR VEHICLE

BACKGROUND OF THE INVENTION

1. Field of the Invention

The present invention relates to a body structure of a motor vehicle and particularly to a side body structure in the vicinity of a rear side sill and of a rear wheel arch.

2. Prior Art

Generally, in motor vehicles, a rear wheel arch portion (rear wheel house) is constituted by a rear wheel arch inner panel and a rear wheel apron connected therewith from inside. Further, the rear wheel arch portion is connected at the front end of the wheel arch inner panel with the rear end of a side sill extended in a lengthwise direction of the vehicle. Further, the rear wheel arch inner panel is connected at a flange portion thereof with a side outer panel. There are several proposed techniques for raising the strength of the connecting point of the front end of the wheel arch inner panel and the rear end of the side sill. For example, Japanese Utility Model Application No. Jitsu-Kai-Hei 1-27992 discloses a side body structure in which a gusset is fixed to the connecting portion of the front end of the wheel arch inner panel and the rear end of the side panel.

In the event of a side impact, generally, since the vehicle gets damages on the whole side face of the vehicle body, it is necessary that the rear side face including the area from the rear part of the side sill to the rear wheel arch portion also has an effective energy absorption structure similar to those of a front pillar and a center pillar.

The side body structure having a gusset at the connecting point of the side sill and the rear wheel arch, as disclosed in the above prior art, is insufficient from the aspect of energy absorption, because in the event of a side impact the area of the connecting point including the gusset, the side sill portion and the rear wheel arch portion are protruded into the rear passenger compartment. As a result the passenger is likely to be seriously injured.

SUMMARY OF THE INVENTION

The present invention is intended to obviate the disadvantage of the prior art and it is summarized as follows.

It is an object of the present invention to provide a side body structure capable of preventing the side sill portion and the rear wheel arch portion from intruding into a rear passenger compartment in an event of the side impact.

Further, it is an object of the present invention to provide a side body structure by which a side impact energy can be absorbed effectively and dispersed broadly to other body structures.

A side body structure of a motor vehicle according to the present invention has a side sill comprising a side sill inner panel, a side sill outer panel and a side sill reinforcement provided between the side sill inner panel and the side sill outer panel. The side body structure also includes a rear floor and a rear wheel arch.

The side body structure according to the first embodiment of the present invention includes the following:

- a crash box reinforcement that has a U-shaped cross section and located outside of the side sill reinforcement;
- a crash box that has a closed cross section formed by the side crash box reinforcement and by the side sill reinforcement located outside of the side sill reinforcement, and secured to the side sill and to the rear wheel arch so as to connect the side sill and the rear wheel arch; and
- a beam member mounted on the rear floor in a transversal direction of the vehicle and connected at an outside end thereof with the side sill and with the crash box.

Further, the side body structure according to the second embodiment of the present invention includes the following:

- a first crash box reinforcement with a U-shaped cross section and provided outside of said side sill reinforcement;
- a first crash box having a closed cross section formed by the first crash box reinforcement and by the side sill reinforcement, and secured to the side sill and to the rear wheel arch so as to connect the side sill and the rear wheel arch;
- a second crash box reinforcement having a U-shaped cross section and located inside the side sill reinforcement;
- a second crash box having a closed cross section formed by the second crash box reinforcement and by the side sill reinforcement, and located on the opposite side of the first crash box with respect to the side sill reinforcement, and connected with the rear floor.

Furthermore, the side body structure according to the third embodiment of the present invention includes in addition to the second aspect:

- a beam member provided on the rear floor in a transversal direction of the vehicle and connected at an outside end thereof with the side sill and with the second crash box.

BRIEF DESCRIPTION OF THE DRAWINGS

A specific embodiment according to the present invention will be described with reference to the accompanying drawings, in which:

FIG. 2b is a cross sectional view of a B—B section in FIG. 2a;

FIG. 3b is a cross sectional view of a B—B section in FIG. 3a; and

DETAILED DESCRIPTION OF THE PREFERRED EMBODIMENTS

Figure 1A:
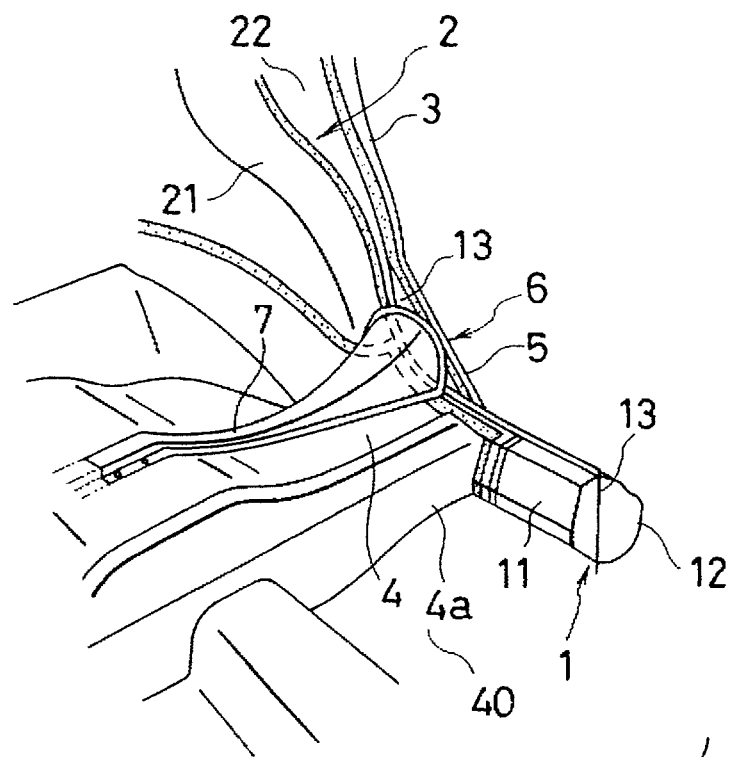
FIG. 1a is a perspective view from inside of a vehicle of a first embodiment showing a connecting portion of a side sill and a rear wheel.

Embodiments according to the present invention will be described in detail by referring to the accompanying drawings.

Referring now to FIG. 1, this shows a first embodiment according to the present invention, A side sill having a closed cross section so that it is extended in a lengthwise direction of a vehicle. The side sill, as is known, is constituted by a side sill inner panel 11, a side sill outer panel 12, and a side sill reinforcement 13. Further, numeral 2 denotes a rear wheel arch which is constituted by a rear wheel apron 21 and a rear wheel arch inner panel 22 secured at an inner flange portion thereof to a rear end of the rear wheel apron 21. The outside of the rear wheel arch inner panel 22 is covered by a side outer panel 3 and the front end thereof is secured to the rear end of the side sill 1.

Further, the left and right side flange portions of a front floor 40 are secured to the inner face of the left and rear side sills 1. In the same manner, the left and right side flange portions of a rear floor 4 are secured to the rear inner face of the left and right rear side sills 1 and to the rear inner face of the rear wheel apron 21.

Numeral 5 denotes a reinforcement having an approximate U-shaped cross section in its fundamental configuration. The reinforcement 5, as illustrated in FIG. 1b, is secured at the front portion thereof to the outside face of a side sill reinforcement 13 and at the rear portion thereof to the rear wheel arch inner panel 22. In this construction, a crash box 6 having a closed cross section constituted by the side sill reinforcement 13 and the reinforcement 5 is formed so as to connect the rear portion of the side sill 1 with the rear wheel arch 2. As shown in FIG. 1c, the outside of the crash box 6 is covered by the side sill outer panel 12 and the side outer panel 3 and the inside thereof is protruded upwards of the side sill inner panel 11 and the rear wheel arch inner panel 22 at the connecting point of the side sill 1 and the rear wheel arch 2.

Further, as shown in FIG. 1c, the above protruding portion of the crash box 6 is secured by butt-welding on the inside face thereof to an outer end of a rear arch beam member 7 extended in the transversal direction of the vehicle. The rear arch beam member 7 is connected by butt-welding at the left and right outside ends thereof with the side sill inner panel 11, the rear wheel arch inner panel 22 and the rear wheel apron 21 respectively. As shown in FIG. 1c, the left and right crash box 6, the left and right side sill 1, and the rear arch beam member 7 are connected with each other and form a closed cross sectional structure. The rear arch beam member 7 is constituted such that it is low and thin at the middle portion thereof and becomes gradually higher and wider towards the left and right outside end portion thereof. Further, numeral 8 denotes a rear side flange extended in a lengthwise direction of the vehicle.

As described above, since the body structure according to the first embodiment is constructed such that the connecting portion of the side sill 1 and the rear wheel arch 2 is reinforced by the crash box 6 and further the crash box 6 is firmly held by the rear arch beam member 7, the rear portion of the side sill 1 and the rear wheel arch 2 can be prevented from intruding into the rear compartment in the case where the vehicle has a side impact. Namely, first the impact energy is absorbed by the deformation and collapse of the crash box 6 and then it is transferred and dispersed broadly to the crash box 6 on the other side and to the rear floor 4 through the rear arch beam member 7.

Further, in this construction, by means of the closed cross section formed by the side sill outer panel 12 and the side sill reinforcement 13 and the crash box 6 connected with this closed cross section, the rear wheel arch 2 can have an effective energy absorption capability similar to those of the center pillar and the front pillar. This is a reasonable body structure fit for small vehicles whose space is limited.

Figure 2A:
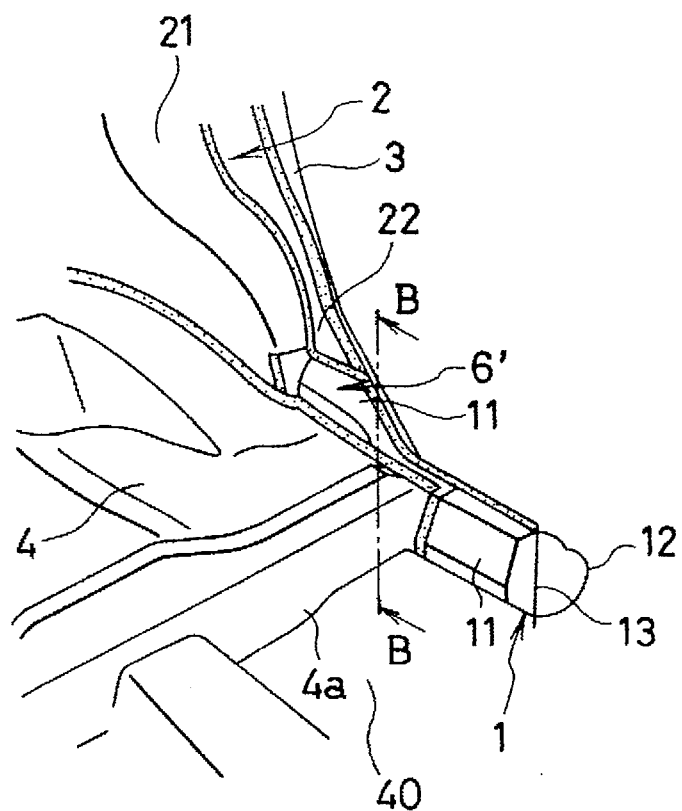
FIG. 2a is a perspective view from inside of a vehicle of the second embodiment showing a connecting portion of a side sill and a rear wheel arch.
Figure 2B:
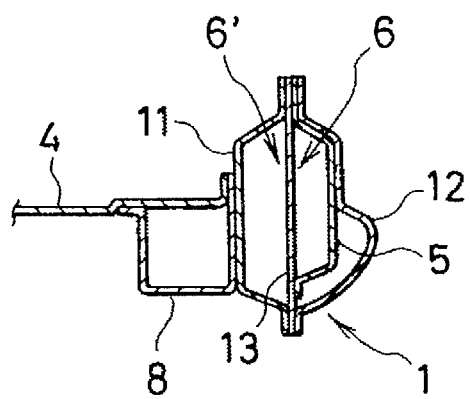

Referring to FIGS. 2a and 2b for showing the second embodiment of the present invention, in this example an inner crash box 6' is provided at the inner side of the crash box 6 in place of the rear arch beam member 7. The inner crash box 6' has a closed cross section formed by an extended portion of the side sill inner panel 11 and the side sill reinforcement 13. Other structures are the same as those in the first embodiment.

In this second embodiment, in the event of the side impact, since the inner crash box 6' firmly holds the crash box 6 from the inside, the impact energy is absorbed by the collapse of the crash box 6 and then by the collapse of the inner crash box 6'. As a result, the intrusion speed of the rear door into the rear compartment is restricted and the impact load is broadly dispersed to the rear floor 4, the rear wheel apron 21 and other members. Further, since there is not a large structural member as the rear arch beam member, a further compact energy absorbing structure can be achieved.

Figure 3A:
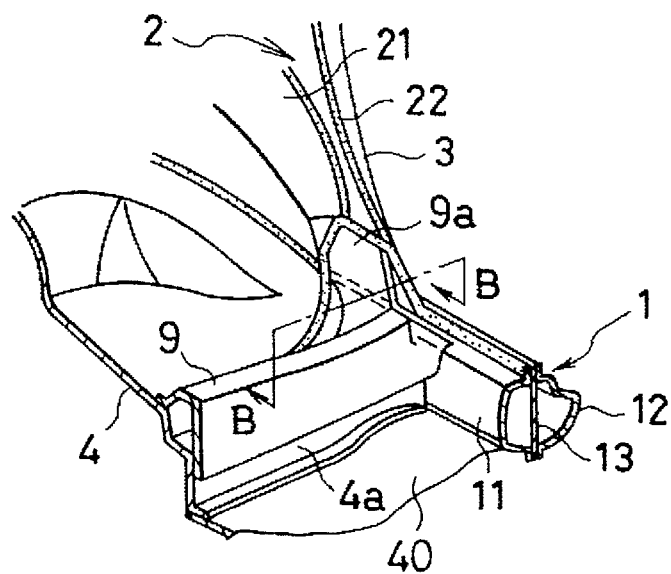
FIG. 3a is a perspective view from inside of a vehicle of the third embodiment showing a connecting portion of a side sill and rear wheel arch.
Figure 3B:
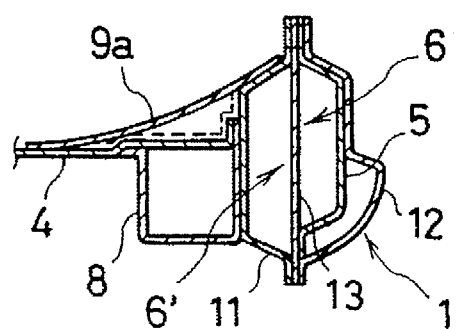

FIGS. 3a and 3b indicate an example according to the third embodiment. In this third embodiment, the inner crash box 6' is provided in addition to the crash box 6 described in the second embodiment. Further, a cross member 9 is secured to the rising face 4a of a seat riser from the front floor 40 such that it forms a closed cross section in the transversal direction of the vehicle. In this embodiment, a rear arch holder 9a integrally formed with the cross member 9 at the left and right ends thereof is connected by welding to the inside face of the inner crash box 6' in such a way that it expands backward and upward and encloses the whole inner crash box 6' from inside.

As described above, in the third embodiment, since the inner crash box 6' supports the crash box 6 from the inside and further the cross member 9 holds the inner cross member 6' from inside through the rear arch holder 9a, the impact energy is received more firmly.

Figure 4:
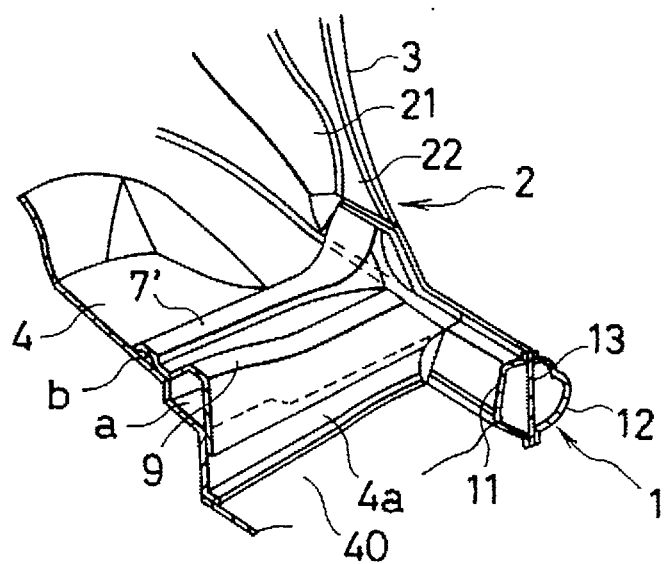
FIG. 4 is a perspective view from inside of a vehicle of the third embodiment showing a beam member and others.

FIG. 4 indicates another example of the third embodiment in which a rear arch beam member 7' having a U-shaped cross section is secured on the rear floor 4. The rear arch beam member 7' is integrally formed with the aforementioned cross member 9, that is, in this embodiment, the cross member 9 comprises a front closed section "a" with a large sectional area and a rear closed cross section "b" with a small sectional area. Both or either of these cross members are secured to the inside face of the inner crush box 6'.

Figure 1B:
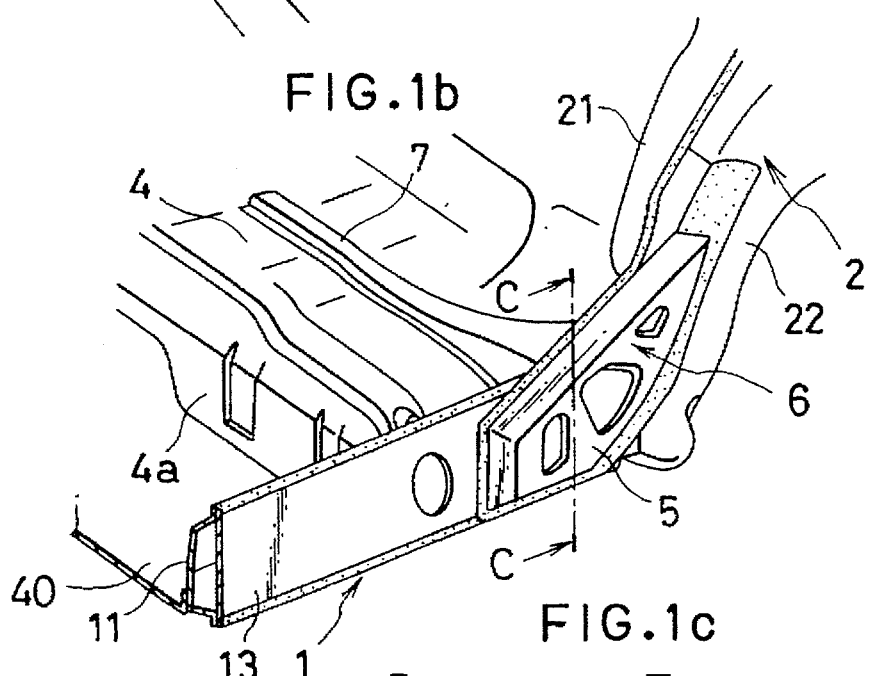
FIG. 1b is a perspective view from outside of a vehicle of the first embodiment showing a connecting portion of a side sill and a rear wheel arch.
Figure 1C:
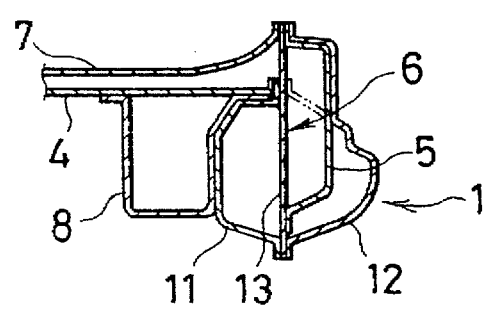
FIG. 1c is a cross sectional view of a C—C section in FIG. 1b.

Further, as a variation of the first embodiment shown in FIG. 1a, substituting for the rear arch beam member 7, the rear arch holder 9a or the rear arch cross member 7' may be constituted so as to support the crash box 6 from inside.

Further, as a further variation of the first embodiment, the rear arch beam member 7 may be provided so as to support the inner crash box 6' from inside.

In summary, the present invention is characterized by the crash box connecting to the side sill and the rear wheel arch. Further, in the second embodiment, the inner crash box is provided in addition to the above crash box on the inside face of the crash box. When the side impact is applied to the rear side face of the vehicle, the side sill portion and the rear wheel arch portion are prevented from intruding into the rear compartment by the energy absorption of these crash boxes.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A body structure of a motor vehicle having a side sill including a side sill inner panel, a side sill outer panel and a side sill reinforcement provided between said side sill inner panel and said side sill outer panel, a rear floor and a rear wheel arch, comprising:

- a crash box reinforcement including a U-shaped cross section and provided outside of said side sill reinforcement;
- a crash box including a closed cross section formed by said side crash box reinforcement and by said side sill reinforcement and provided outside of said side sill reinforcement and secured to said side sill and to said rear wheel arch so as to connect said side sill and said rear wheel arch; and
- a cross member provided on said rear floor in a transversal direction of said vehicle and connected at an outside end thereof with said side sill and with said crash box.

2. The body structure according to claim 1, wherein said cross member has a closed cross section formed by at least one U-shaped channel and said rear floor and is formed such that it is relatively low in height at the middle portion thereof and is relatively high in height and relatively broad in width at the outside end thereof.

* * * * *